(No Model.)
C. L. PINNEY.
PIPE BINDER.
No. 603,455.  Patented May 3, 1898.
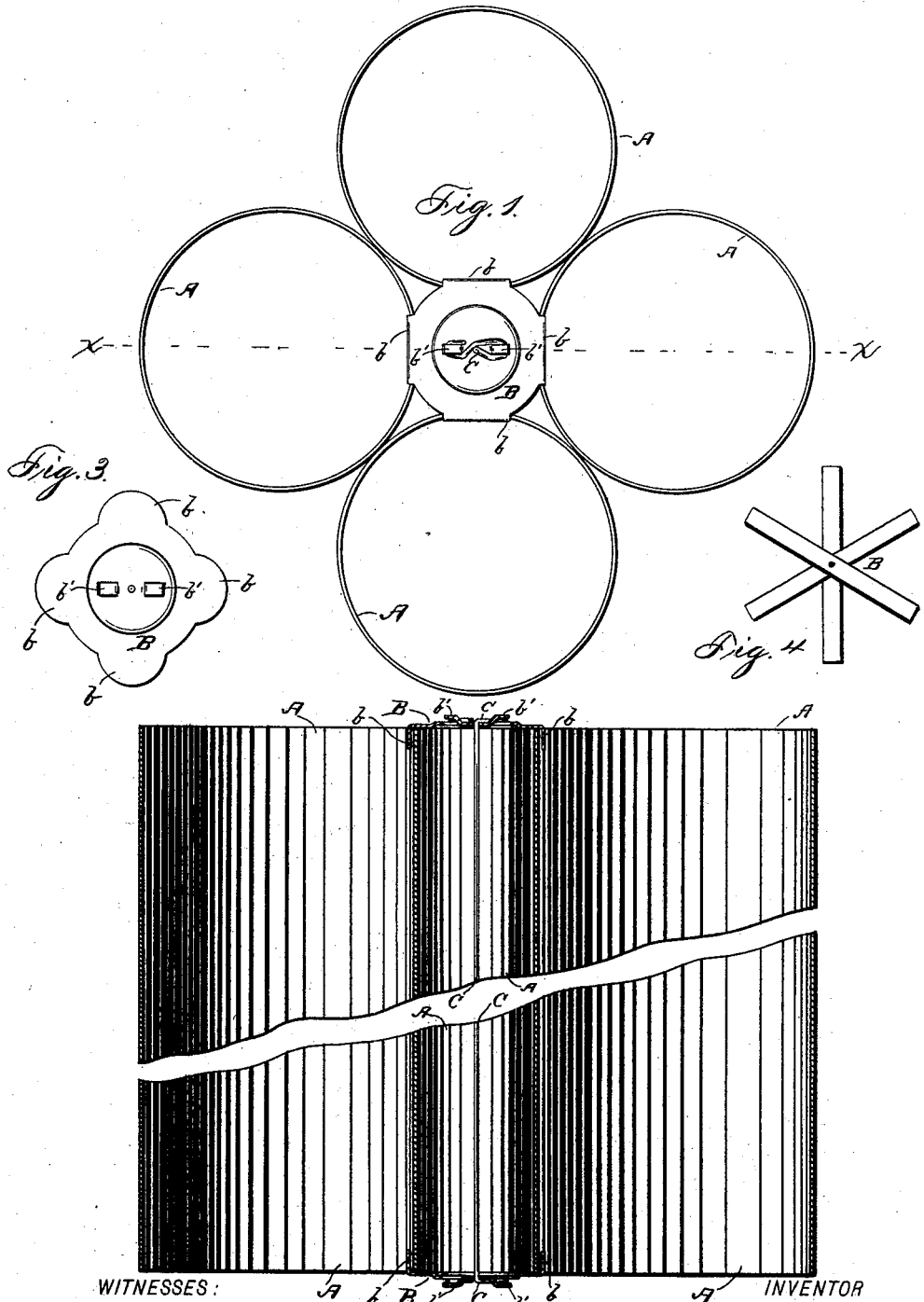
WITNESSES:
Otis D. Swett.
John W. Dudley.
INVENTOR
Charles L. Pinney.
BY
Thomas P. Simpson
ATTORNEY.

UNITED STATES PATENT OFFICE.

CHARLES L. PINNEY, OF LOS ANGELES, CALIFORNIA.

PIPE-BINDER.

SPECIFICATION forming part of Letters Patent No. 603,455, dated May 3, 1898.

Application filed May 26, 1897. Serial No. 638,205. (No model.)

*To all whom it may concern:*

Be it known that I, CHARLES L. PINNEY, a citizen of the United States, residing at Los Angeles, in the county of Los Angeles and State of California, have invented certain new and useful Improvements in Pipe-Binders; and I do declare the following to be a full, clear, and exact description of the invention, such as will enable others skilled in the art to which it appertains to make and use the same, reference being had to the accompanying drawings, and to the letters of reference marked thereon, which form a part of this specification.

The invention relates to holding stove or other pipes in bundles convenient for storage or transportation, the same having heretofore been baled or bundled together with wire wound about them and secured by punching holes in the pipes.

The special object of my invention is to avoid punching holes in the pipes and to secure them so compactly and securely in the bundle that they will not come loose or be damaged in handling.

Figure 1 of the drawings is an end elevation showing a bundle of pipes with my invention applied; Fig. 2, a horizontal section on the dotted line $x\ x$ of Fig. 1, the two caps connected by the central wire; Fig. 3, a detail exterior view of one of the caps before its lugs have been bent over the pipes, and Fig. 4 a detail view of a modification of the cap more particularly adapted for use when small pipes are to be bundled in greater number.

In the drawings, A represents the pipes in a bundle, and B B the cap-plates of sheet metal, by which the pipes are bound together. Each of these caps is provided with the peripheral lugs $b$, whose number will be the same as that of the pipes which are to be fastened together. The caps are held tightly to the ends of the pipes by a central wire C, which is drawn taut, passed through the centers of the caps, and fastened in the form of a figure 8 on the integral outwardly-projecting tongues $b'$ or in any other suitable way. The wires are then bent down and cut off, leaving a closely-packed and securely-bound bundle, which will stand the usual hard usage without becoming loose. When a single pipe is to be taken from a bundle, the corresponding lugs $b\ b$ in the two caps are unbent and the pipe released.

What I claim as new, and desire to protect by Letters Patent, is—

A fastening device, for the purpose of holding pipes in bundles, consisting of the plates B with peripheral lugs $b$ and tongues $b'$, and the central wires C adapted to be secured about said tongues as shown and described.

In testimony whereof I affix my signature in presence of two witnesses.

CHARLES L. PINNEY. [L. S.]

Witnesses:
   I. W. STEWART,
   W. R. HERVEY.